(12) United States Patent
Seo et al.

(10) Patent No.: US 9,602,262 B2
(45) Date of Patent: Mar. 21, 2017

(54) METHOD FOR SETTING SEARCH REGIONS FOR DOWNLINK CONTROL CHANNELS IN WIRELESS COMMUNICATION SYSTEMS AND APPARATUS FOR SAME

(71) Applicant: LG Electronics Inc., Seoul (KR)

(72) Inventors: Hanbyul Seo, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 14/395,244

(22) PCT Filed: Apr. 1, 2013

(86) PCT No.: PCT/KR2013/002679
§ 371 (c)(1),
(2) Date: Oct. 17, 2014

(87) PCT Pub. No.: WO2013/157758
PCT Pub. Date: Oct. 24, 2013

(65) Prior Publication Data
US 2015/0085779 A1    Mar. 26, 2015

Related U.S. Application Data

(60) Provisional application No. 61/625,650, filed on Apr. 17, 2012, provisional application No. 61/699,833, filed on Sep. 11, 2012.

(51) Int. Cl.
*H04L 5/00* (2006.01)
*H04J 11/00* (2006.01)

(52) U.S. Cl.
CPC .......... *H04L 5/0053* (2013.01); *H04J 11/00* (2013.01); *H04L 5/0046* (2013.01)

(58) Field of Classification Search
CPC .......................... H04L 5/0053; H04L 5/0046
See application file for complete search history.

(56) References Cited

U.S. PATENT DOCUMENTS

| | | | |
|---|---|---|---|
| 2013/0064215 A1* | 3/2013 | Gao | H04L 5/0016 370/330 |
| 2014/0050159 A1* | 2/2014 | Frenne | H04W 72/042 370/329 |

FOREIGN PATENT DOCUMENTS

| KR | 10-2008-0099063 A | 11/2008 |
|---|---|---|
| KR | 10-2009-0089770 A | 8/2009 |
| KR | 10-2010-0031510 A | 3/2010 |
| KR | 10-2010-0033532 A | 3/2010 |

OTHER PUBLICATIONS

Fujitsu, "UE-Specific Search Space Design for Enhanced Downlink Control Channel", R1-121195, 3GPP TSG-RAN WG1, #68bis, Mar. 26-30, 2012.

* cited by examiner

*Primary Examiner* — Jackie Zuniga Abad
(74) *Attorney, Agent, or Firm* — Dentons US LLP

(57) ABSTRACT

The present invention relates to a method for transmitting an Enhanced Physical Downlink Control Channel (EPDCCH) from a based station to a terminal in a wireless communication system. In particular, the method includes the steps of: setting resource blocks for the EPDCCH; re-indexing by permutation indexes of the resource blocks; defining an Enhanced Control Channel Element (ECCE) for each of the re-indexed resource blocks; selecting the ECCEs in a number corresponding to the aggregation level of the EPDCCH; and transmitting the EPDCCH to the terminal using the selected ECCEs.

4 Claims, 19 Drawing Sheets

(a) Control-plane protocol stack (b) User-plane protocol stack (a) 1 Tx or 2 Tx (b) 4 Tx4 TX

METHOD FOR SETTING SEARCH REGIONS FOR DOWNLINK CONTROL CHANNELS IN WIRELESS COMMUNICATION SYSTEMS AND APPARATUS FOR SAME

This Application is a 35 U.S.C. §371 National Stage entry of International Application No. PCT/KR2013/002679, filed Apr. 1, 2013, which claims benefit of Provisional Application Nos. 60/625,650 filed Apr. 17, 2012 and 61/699,883 filed Sep. 11, 2012, all of which are incorporated by reference in their entirety herein.

TECHNICAL FIELD

The present invention relates to a wireless communication system and, more specifically, to a method for setting a search space for a downlink control channel in a wireless communication system and an apparatus therefor.

BACKGROUND ART

A brief description will be given of a $3^{rd}$ Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency region in which the DL data is supposed to be transmitted, a coding scheme, a data size, Hybrid Automatic Repeat reQuest (HARM) information, etc. by transmitting DL scheduling information to the UE. Regarding UL data, the eNB notifies a particular UE of a time-frequency region in which the UE can transmit data, a coding scheme, a data size, HARQ information, etc. by transmitting UL scheduling information to the UE. An interface for transmitting user traffic or control traffic may be used between eNBs. A Core Network (CN) may include an AG and a network node for user registration of UEs. The AG manages UE mobility on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolution is required to achieve future competitiveness. Specifically, cost reduction per bit, increased service availability, flexible use of frequency bands, simplified structure, an open interface, appropriate power consumption of UEs, etc. are required.

DISCLOSURE

Technical Problem

An object of the present invention devised to solve the problem lies in a method for setting a search space for a downlink control channel in a wireless communication system and an apparatus therefor.

Technical Solution

In an aspect of the present invention, a method for transmitting, by a base station, an EPDCCH (Enhanced Physical Downlink Control Channel) to a user equipment (UE) in a wireless communication system includes: setting resource blocks for the EPDCCH; re-indexing indexes of the resource blocks through permutation; defining an ECCE (Enhanced Control Channel Element) for each of the re-indexed resource blocks; selecting ECCEs in a number corresponding to an aggregation level of the EPDCCH; and transmitting the EPDCCH to the UE using the selected ECCEs.

The selecting of the ECCEs may include selecting ECCEs corresponding in number to the aggregation level from one of the re-indexed resource blocks. The selecting of the ECCEs may include selecting ECCEs corresponding in number to the aggregation level from resource blocks having a specific number of consecutive indexes from among the re-indexed resource blocks.

The re-indexing may include: allocating first indexes represented as binary numbers to the resource blocks; and re-allocating second indexes representing the first indexes in reverse order to the corresponding resource blocks. The re-indexing may include: allocating first indexes to the resource blocks; and re-allocating second indexes, obtained by inputting the first indexes to an $N_{row} \times N_{col}$ matrix in column order and reading the first indexes in row order, to the resource blocks. The number of rows of the matrix, $N_{row}$, may be determined by the number of resource blocks for the EPDCCH.

Additionally, the re-indexing may include: dividing the resource blocks for the EPDCCH into a plurality of resource block groups and allocating first group indexes to the resource block groups; and re-allocating second group indexes, obtained by permuting the first group indexes, to the resource block groups. In this case, while resource blocks included in the resource block groups may be consecutive in the frequency domain, the resource blocks may be space apart by a predetermined interval in the frequency domain.

In another aspect of the present invention, provided herein is a method for receiving, by a UE, an EPDCCH from a base station in a wireless communication system, the method including: setting resource blocks for the EPDCCH; re-indexing indexes of the resource blocks through permutation; defining an ECCE for each of the re-indexed resource blocks; and monitoring EPDCCH candidates composed of ECCEs in a number corresponding to an aggregation level of the EPDCCH, in the re-indexed resource blocks, to receive the EPDCCH.

Advantageous Effects

According to embodiments of the present invention, it is possible to efficiently set a search space for a downlink control channel in a wireless communication system.

The effects of the present invention are not limited to the above-described effects and other effects which are not described herein will become apparent to those skilled in the art from the following description.

BEST MODE

The configuration, operation, and other features of the present invention will readily be understood with embodiments of the present invention described with reference to the attached drawings. Embodiments of the present invention as set forth herein are examples in which the technical features of the present invention are applied to 3GPP.

While embodiments of the present invention are described in the context of LTE and LTE-A, these embodiments are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

Figure 1:
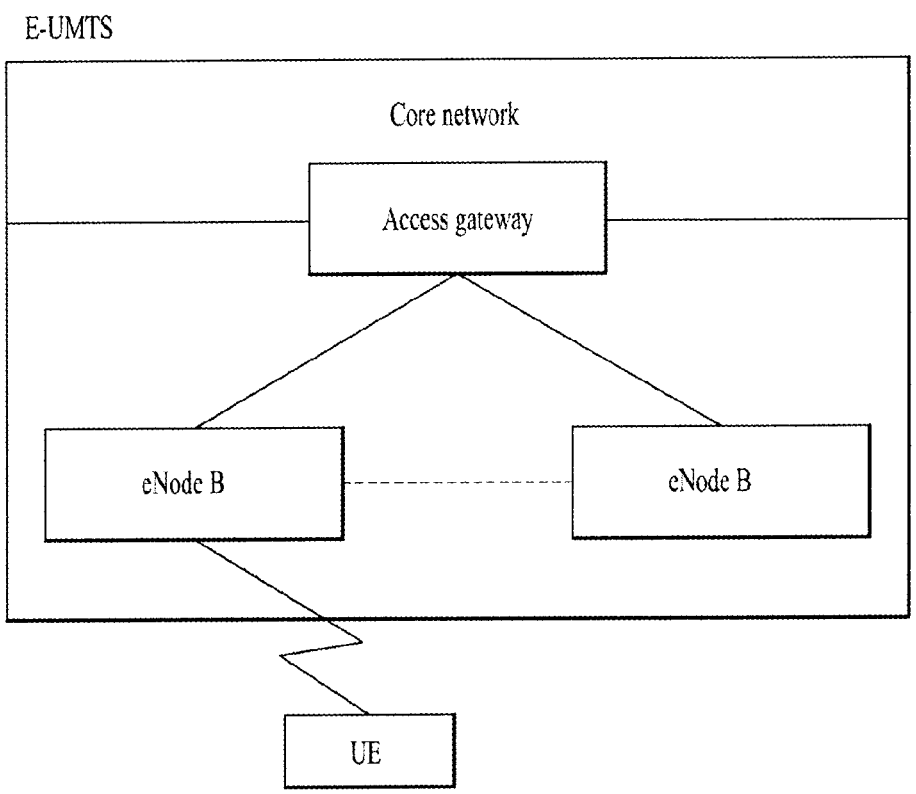
FIG. 1 illustrates a configuration of an E-UMTS network as an example of a wireless communication system.
Figure 2:
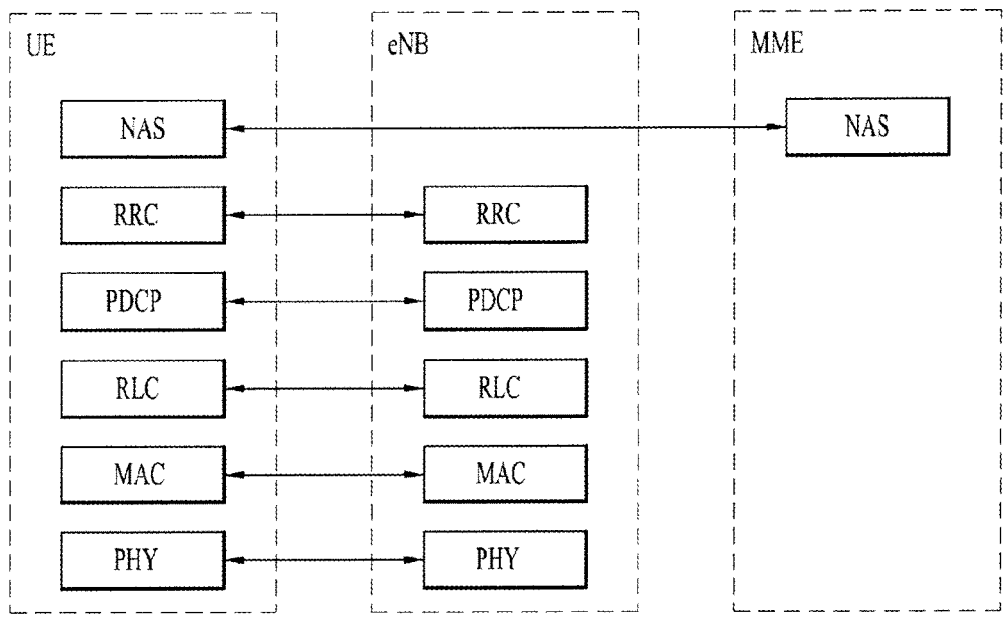
FIG. 2a and b illustrate a control-plane protocol stack and a user-plane protocol stack in a radio interface protocol architecture conforming to a 3GPP radio access network standard between a UE and an E-UTRAN.
Figure 2:
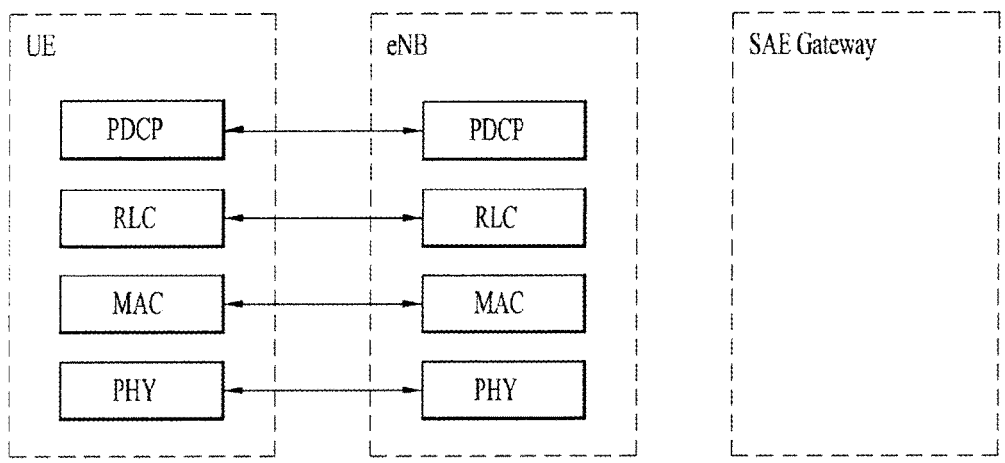

FIG. 2 illustrates control-plane and user-plane protocol stacks in a radio interface protocol architecture conforming to a 3GPP wireless access network standard between a UE and an E-UTRAN. The control plane is a path along which the UE and the E-UTRAN transmit control messages to manage calls, and the user plane is a path along which data generated from an application layer, for example, voice data or Internet packet data is transmitted.

A physical (PHY) layer at Layer 1 (L1) provides information transfer service to a higher layer using physical channels. The PHY layer is connected to a medium access control (MAC) layer, which is a higher layer, via transport channels (transantenna port channels). The transport channels deliver data between the MAC layer and the PHY layer. Data is transmitted on physical channels between the PHY layers of a transmitter and a receiver. The physical channels use time and frequency as radio resources. Specifically, the physical channels are modulated using Orthogonal Frequency Division Multiple Access (OFDMA) for downlink and using Single Carrier Frequency Division Multiple Access (SC-FDMA) for uplink.

The MAC layer at Layer 2 (L2) provides service to a higher layer, i.e. a Radio Link Control (RLC) layer, via logical channels. The RLC layer at L2 supports reliable data transmission. RLC functionality may be implemented in a functional block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transport channels used to deliver data from the network to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
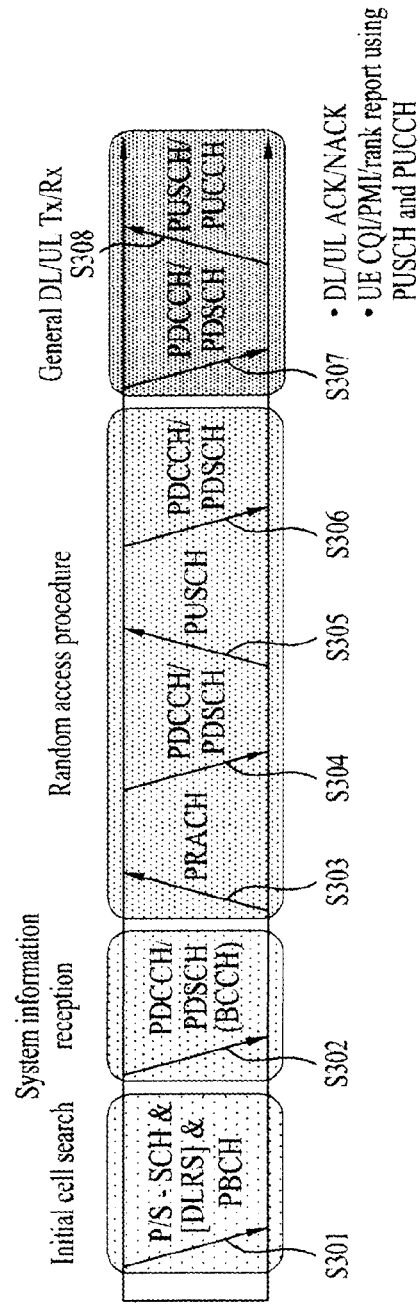
FIG. 3 illustrates physical channels used in a 3GPP system and a general signal transmission method using the physical channels.

FIG. 3 illustrates physical channels used in 3GPP and a general method for transmitting signals on the physical channels.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During initial cell search, the UE may monitor a DL channel state by receiving a DownLink Reference Signal (DL RS).

After initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on UL or receives from the eNB on DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In 3GPP LTE, the UE may transmit control information such as a CQI, a PMI, an RI, etc. on a PUSCH and/or a PUCCH.

Figure 4:
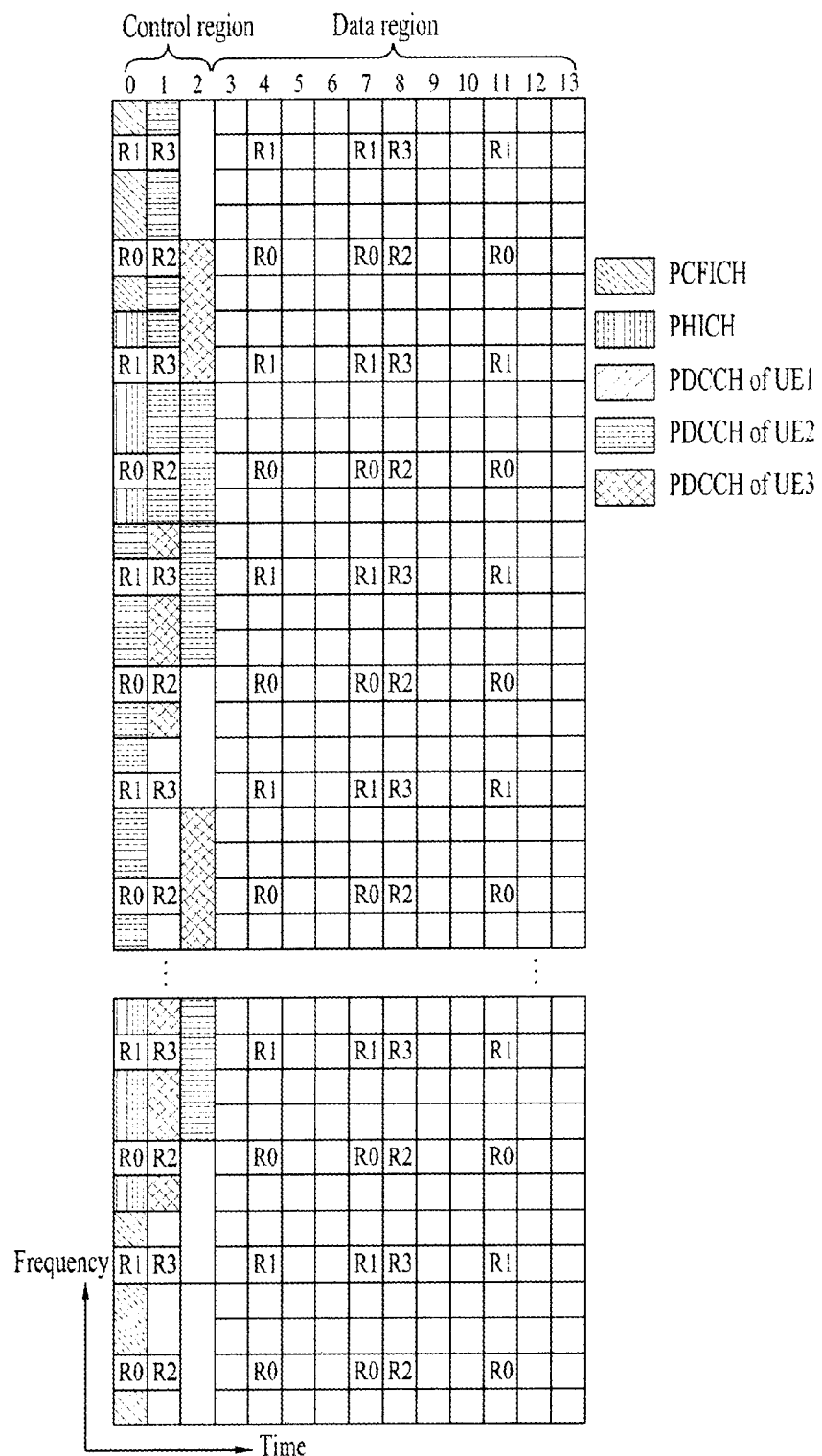
FIG. 4 illustrates a structure of a downlink radio frame used in LTE.

FIG. 4 illustrates control channels included in the control region of a subframe in a downlink radio frame.

Referring to FIG. 4, a subframe includes 14 OFDM symbols. A control region occupies the first one to three OFDM symbols and a data region occupies the other 13 to 11 OFDM symbols in the subframe according to the configuration of the subframe. In FIG. 4, reference characters R1 to R4 denote Reference Signals (RSs) or pilot signals for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a Physical Control Format Indicator Channel (PCFICH), a Physical Hybrid-ARQ Indicator Channel (PHICH), a Physical Downlink Control Channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four Resource Element Groups (REGs), each REG being distributed across the control region based on a cell Identity (ID). One REG has four REs. An RE is a minimum physical resource defined as one subcarrier by one OFDM symbol. A PCFICH value, which is modulated using Quadrature Phase Shift Keying (QPSK), ranges from 1 to 3 or from 2 to 4 according to a bandwidth.

The PHICH carries HARQ ACK/NACK for uplink transmission. That is, the PHICH is a channel used to deliver HARQ ACK/NACK for uplink HARQ. The PHICH includes one REG and is scrambled cell-specifically. The ACK/NACK is indicated in one bit and modulated using Binary Phase Shift Keying (BPSK). The modulated ACK/NACK is spread with a Spreading Factor (SF) of 2 or 4. A plurality of PHICHs is mapped to the same resources form a PHICH group. The number of PHICHs multiplexed into a PHICH group is determined according to the number of spreading codes. The same PHICH (group) occurs three times to achieve a diversity gain in the frequency and/or time domain.

A PDCCH is allocated to the first n OFDM symbols of a subframe. Here, n is 1 or a larger integer indicated by the PCFICH. The PDCCH includes one or more Control Channel Elements (CCEs). The PDCCH is used to inform a UE or a UE group of the resource allocation of transport channels, namely a PCH and a DownLink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, if the Cyclic Redundancy Check (CRC) of a particular PDCCH is masked by Radio Network Temporary Identity (RNTI) "A" and information about data transmitted in radio resources "B" (e.g. a frequency position) with DCI format "C" being a transport format (e.g. a Transport Block (TB) size, a modulation scheme, coding information, etc.) is transmitted in a particular subframe, then UEs within the cell of the eNB monitor the PDCCH using their RNTI information. If one or more UEs have RNTI "A", then the UEs receive the PDCCH and receive a PDSCH indicated by "B" and "C" based on the received information of the PDCCH.

Figure 5:
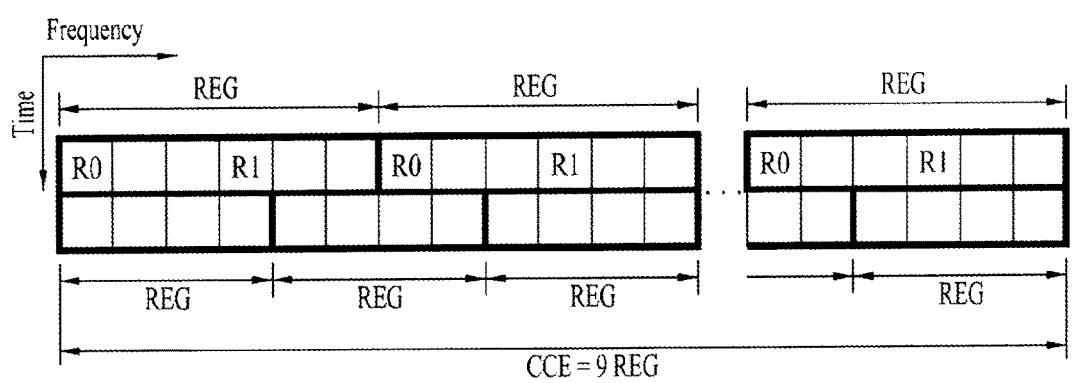
FIG. 5a and b illustrate resource units used to configure a downlink control channel in LTE.
Figure 5:
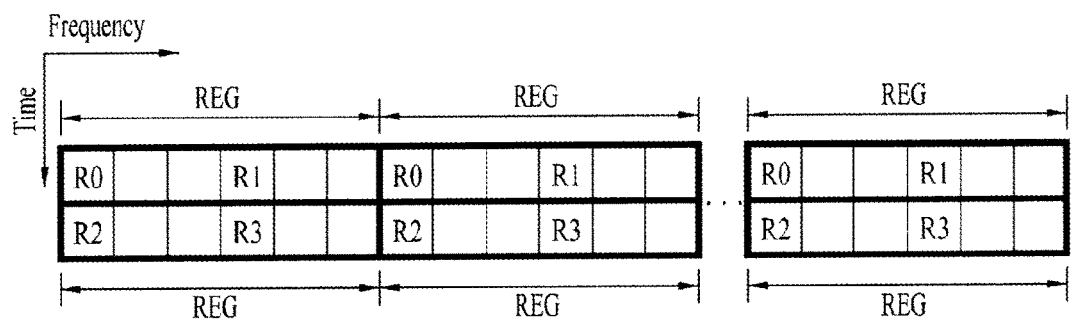

FIG. 5 illustrates resource units used to configure a downlink control channel in LTE. FIG. 5(a) shows a case in which the number of transmit (Tx) antennas is 1 or 2 and FIG. 5(b) shows a case in which the number of Tx antenna is 4. Although a different RS pattern is used according to the number of Tx antennas, REs are configured for a DL control channel in the same manner.

Referring to FIG. 5, a basic resource unit of a DL control channel is an REG. The REG includes four contiguous REs except for REs carrying RSs. REGs are marked with bold lines in FIG. 5. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ ($\geq L$) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 6:
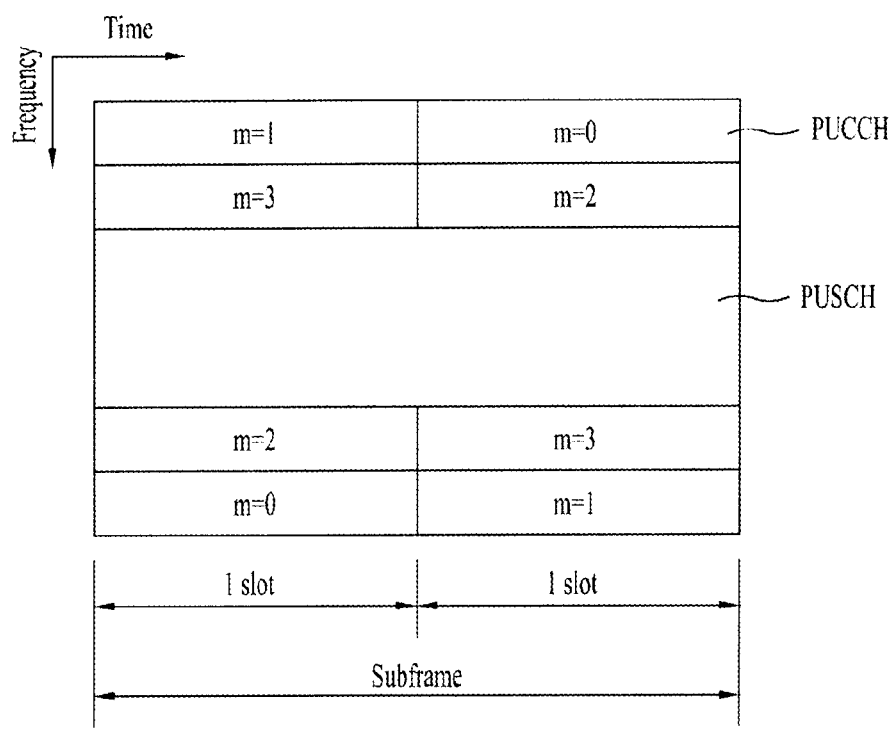
FIG. 6 illustrates a structure of an uplink subframe used in LTE.

FIG. 6 illustrates a structure of a UL subframe in LTE.

Referring to FIG. 6, a UL subframe may be divided into a region to which a physical uplink control channel (PUCCH) carrying control information is allocated and a region to which a physical uplink shared channel (PUSCH) carrying user data is allocated. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, and a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

In an LTE TDD (Time Division Duplex) system, a radio frame includes 2 half frames and each half frame is composed of 4 normal subframes each including 2 slots and a special subframe including DwPTS (Downlink Pilot Time Slot), a guard period (GP) and UpPTS (Uplink Pilot Time Slot).

In the special subframe, DwPTS is used for initial cell search, synchronization or channel estimation in a UE. UpPTS is used for channel estimation of a BS and uplink transmission synchronization of a UE. That is, DwPTS is used for downlink transmission and UpPTS is used for uplink transmission. Particularly, UpPTS is used for PRACH preamble or SRS transmission. The GP is a period for cancelling interference generated on uplink due to multi-path delay of a downlink signal between uplink and downlink.

The 3GPP standard defines configurations, as shown in Table 1, for the special subframe. In Table 1, a case in which $T_s=1/(15000 \times 2048)$ corresponds to DwPTS and UpPTS and the remaining region is set to the GP.

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In LTE TDD, UL/DL configuration is as shown in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D denotes a downlink subframe, U denotes an uplink subframe and S indicates the aforementioned special subframe. Table 2 shows downlink-uplink switch-point periodicity in uplink-downlink subframe configuration.

In the current wireless communication environment, data throughput for a cellular network is rapidly increasing with the emergence and propagation of various devices requiring M2M (machine-to-machine) communication and high data throughput. To meet high data throughput, communication technology evolves to carrier aggregation for enabling efficient use of a larger number of frequency bands, MIMO for increasing data capacity within a limited frequency band, and coordinated multi-point (CoMP) and communication environments evolves to environments in which the density of accessible nodes around a UE increases. A system having high-density nodes can show higher system performance according to cooperation among nodes. This scheme provides much higher performance than a scheme in which nodes operate as independent base stations (BSs) (which may be called advanced BSs (ABSs), Node-Bs (NBs), eNode-Bs (eNBs), access points (APs), etc.).

Figure 7:
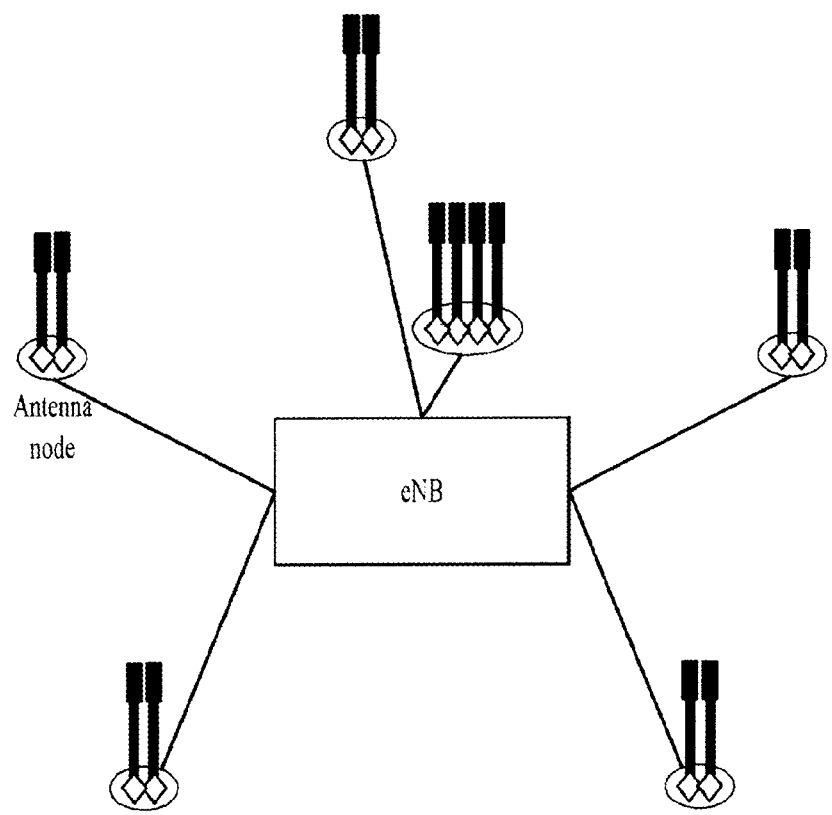
FIG. 7 illustrates a multi-node system from among next-generation communication systems.

FIG. 7 illustrates a multi-node system from among next-generation communication systems.

Referring to FIG. 7, when transmission and reception of all nodes are managed by one controller and thus the nodes operates as an antenna group of one cell, the system can be regarded as a distributed multi-node system (DMNS) which forms one cell. The individual nodes may be assigned respective node IDs or may operate as antennas in the cell without having node IDs. However, if the nodes have different cell identifiers IDs, then the system can be regarded as a multi-cell system. When multiple cells are configured in an overlapping manner according to coverage, this is called a multi-tier network.

A Node-B, eNode-B, PeNB, HeNB, RRH (Remote Radio Head), relay and distributed antenna can be a node and at least one antenna is installed in one node. A node may be called a transmission point. While nodes generally refer to a group of antennas spaced by a predetermined distance or more, nodes can be applied to the present invention even if the nodes are defined as an arbitrary antenna group irrespective of distance.

With the introduction of the aforementioned multi-node system and relay nodes, various communication schemes can be applied to improve channel quality. To apply MIMO and CoMP to multi-node environments, however, introduction of a new control channel is needed. Accordingly, an enhanced PDCCH (EPDCCH) is newly introduced as a control channel. The EPDCCH is allocated to the data region (referred to as a PDSCH region hereinafter) instead of the control region (referred to as a PDCCH region). Since control information about a node can be transmitted to each UE through the EPDCCH, PDCCH region shortage can be solved. For reference, the EPDCCH is not provided to legacy UEs and can be received only by LTE-A UEs. In addition, the EPDCCH is transmitted and received on the basis of a DM-RS (or CSI-RS) instead of a CRS corresponding to a cell-specific reference signal.

Figure 8:
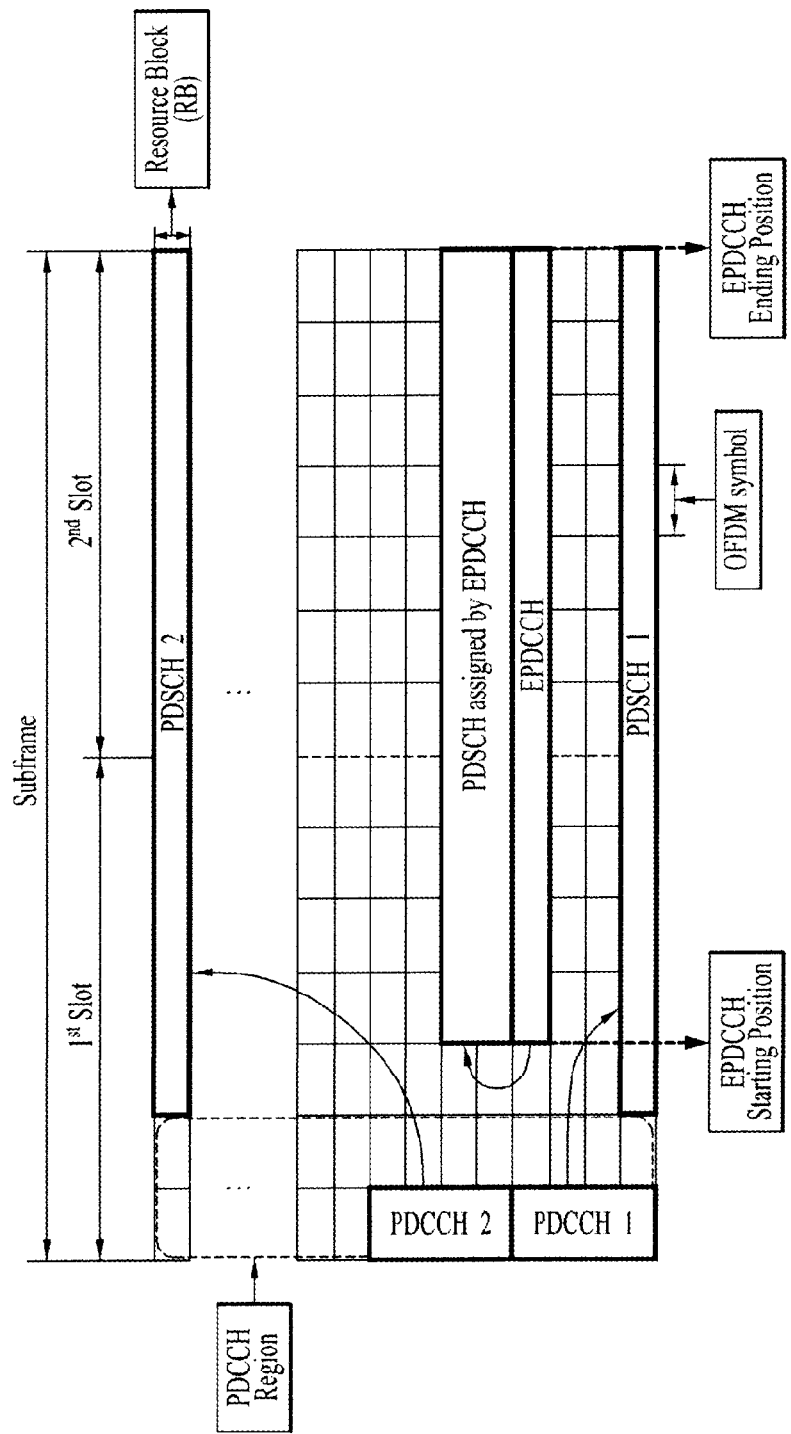
FIG. 8 illustrates an EPDCCH and a PDSCH scheduled by the EPDCCH.

FIG. 8 illustrates an example of an EPDCCH and a PDSCH scheduled by the EPDCCH.

Figure 9:
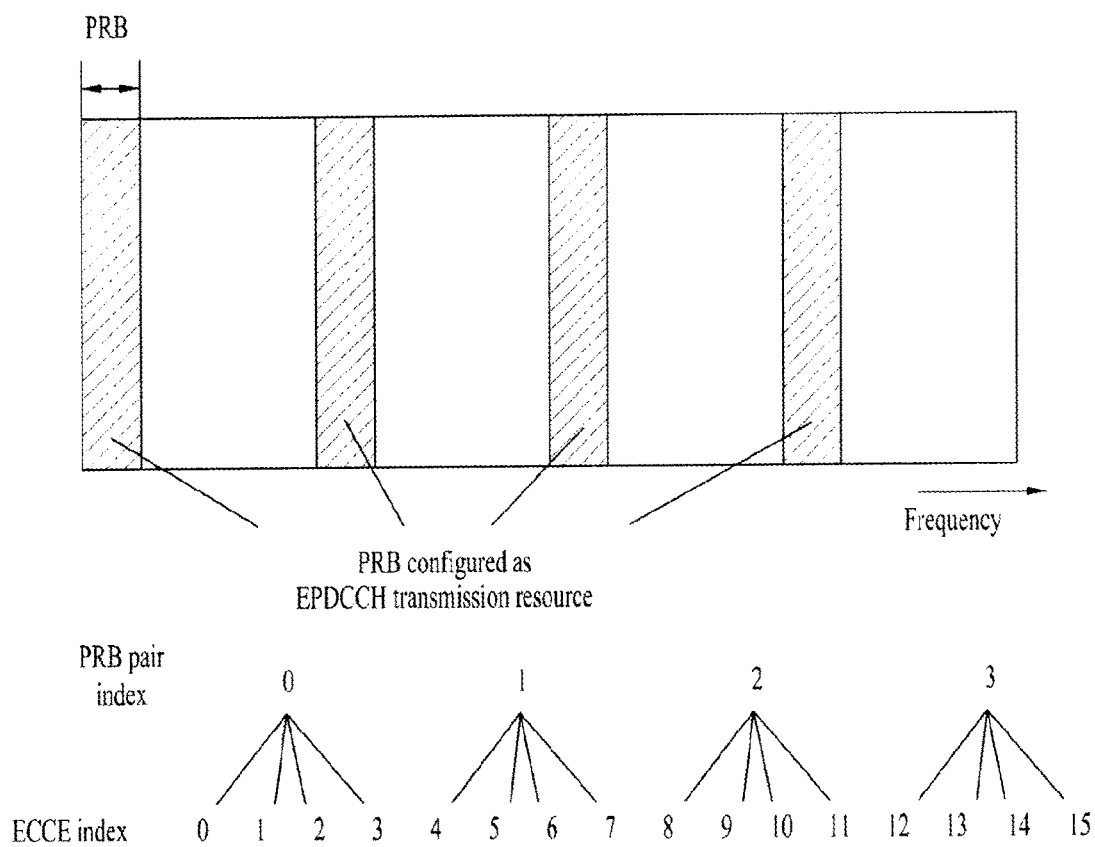
FIG. 9 illustrates an example of setting an EPDCCH transmission region using PRB pairs spaced apart at a predetermined interval.

Referring to FIG. 8, PDCCH 1 and PDCCH 2 respectively schedule PDSCH 1 and PDSCH 2 and the EPDCCH schedules another PDSCH. FIG. 9 shows that the EPDCCH is transmitted, starting from the fourth symbol of the corresponding subframe to the last symbol.

EPDCCHs can be transmitted through the PDSCH region used to transmit data and a UE monitors EPDCCHs in order to detect presence or absence of an EPDCCH destined therefor. That is, to obtain DCI included in the EPDCCH, the UE needs to perform blind decoding for a predetermined number of EPDCCH candidates in a search space with aggregation level L Like the aggregation level of the search space for the PDCCH, the aggregation level of the search space for the EPDCCH refers to the number of enhanced CCE (ECCEs) used to transmit DCI.

EPDCCH transmission can be classified into localized EPDCCH transmission and distributed EPDCCH transmission according to a method of mapping REs corresponding to ECCEs. Localized EPDCCH transmission corresponds to a case in which all REs corresponding to ECCEs are extracted from the same PRB pair and has an advantage in that beamforming optimized for each UE can be performed. On the other hand, distributed EPDCCH transmission corresponds to a case in which REs corresponding to ECCEs are extracted from different PRB pairs. Distributed EPDCCH transmission can use frequency diversity although it imposes restrictions on beamforming optimization.

It is assumed that one PRB pair is divided into K ECCEs in the following description for convenience. When N PRB pairs are used on this assumption, a total of N×K ECCEs can be defined.

PRB pairs configured as an EPDCCH transmission region need to be appropriately disposed in the frequency domain. If all PRB pairs corresponding to an E-PDCCH transmission region are contiguous and concentrated in a specific frequency band, then it is very difficult to find resources through which an E-PDCCH will be transmitted when channels causes severe destructive interference in the frequency band.

FIG. 9 illustrates an example of configuring an EPDCCH transmission region using PRB pairs spaced apart by a predetermined interval. The example shown in FIG. 9 is based on the assumption that K, which is the number of ECCEs divided from one PRB pair, is 4 and N, which is the number of configured PRB pairs, is 4.

Referring to FIG. 9, PRBs shaded in the figure are separately collected and given indexes, a predetermined number of ECCEs is formed per PRB pair and a search space in which a UE will detect an EPDCCH is configured on the basis of the ECCEs.

In this case, a gap between neighboring PRB pair indexes is an important factor in configuration of an E-PDCCH search space. Particularly, the importance of the gap between neighboring PRB pair indexes may be magnified when distributed EPDCCH transmission, in which one EPDCCH is transmitted using two or more PRB pairs, is applied. For example, when an EPDCCH composed of two ECCEs at aggregation level 2 is transmitted, if ECCEs belonging to two consecutive PRB pairs in terms of PRB pair index, that is, ECCE #0 and ECCE #4 in FIG. 9 are selected in order to obtain frequency diversity gain, then the gap is not relatively wide even if spaced frequency resources are used.

To solve this problem, provided is a method of selecting ECCEs having a relatively large gap therebetween by changing a gap between PRB pairs including aggregated ECCEs on the basis of the number of PRB pairs allocated to an E-PDCCH search space. For example, when four PRB pairs are configured, as shown in FIG. 9, and the aggregation level is 2, ECCEs such as ECCE #0 and ECCE #8 spaced apart from each other by two PRB pairs are preferably selected. If six PRB pairs are configured and the aggregation level is 2, ECCEs spaced apart from each other by three PRB pairs are preferably selected to maintain a gap corresponding to half the total number of configured PRB pairs.

The above-described method is generalized as follows. When L ECCEs starting from ECCE #n are aggregated for distributed transmission of an E-PDCCH at aggregation level L, ECCE #n, #(n+T), #(n+2T), . . . , #(n+(L−1)T) may be used and T, which is an interval of the ECCEs may be set to $$K \times \left\lfloor \frac{N}{L} \right\rfloor.$$

Here, ⌊x⌋ is a function indicating a maximum integer less than or equal to x. When an EPDCCH at aggregation level L is configured by aggregating L ECCEs in this manner, that is, when ECCE aggregation is performed, the corresponding EPDCCH selects one ECCE for every N/L PRB pairs from among N PRB pairs.

When this operation is applied to FIG. 9, an EPDCCH is configured using ECCE #n and ECCE #(n+8) in the case of aggregation level 2 and an EPDCCH is configured using ECCE #n, ECCE #(n+4), ECCE #(n+8) and ECCE #(n+12) in the case of aggregation level 4 since K is 4 and N is 4. When there is an ECCE index exceeding a maximum value from among all ECCE indexes, ECCEs may be configured such that the ECCEs are present in a given ECCE index region through a modulo operation. Furthermore, when a larger number of PRB pairs is allocated and thus N increases, an interval between aggregated ECCEs also increases and thus distributed EPDCCH transmission can be performed using ECCEs spaced apart at a wider interval in configured PRB pairs. In addition, distribution of ECCE indexes in the PRB domain is also important in localized EPDCCH transmission. For example, when localized EPDCCH candidates are sequentially formed on PRB indexes, EPDCCH candidates are concentrated in a specific frequency band, disturbing frequency selective characteristics.

Accordingly, as a method for effectively configuring an EPDCCH search space even when EPDCCH resource regions set by an eNB are provided in an arbitrary number and form, a method for permuting a sequence of PRB pairs set to an EPDCCH transmission region, according to a predetermined rule, dividing the PRB pairs into ECCEs and forming an EPDCCH search space can be considered.

Figure 10:
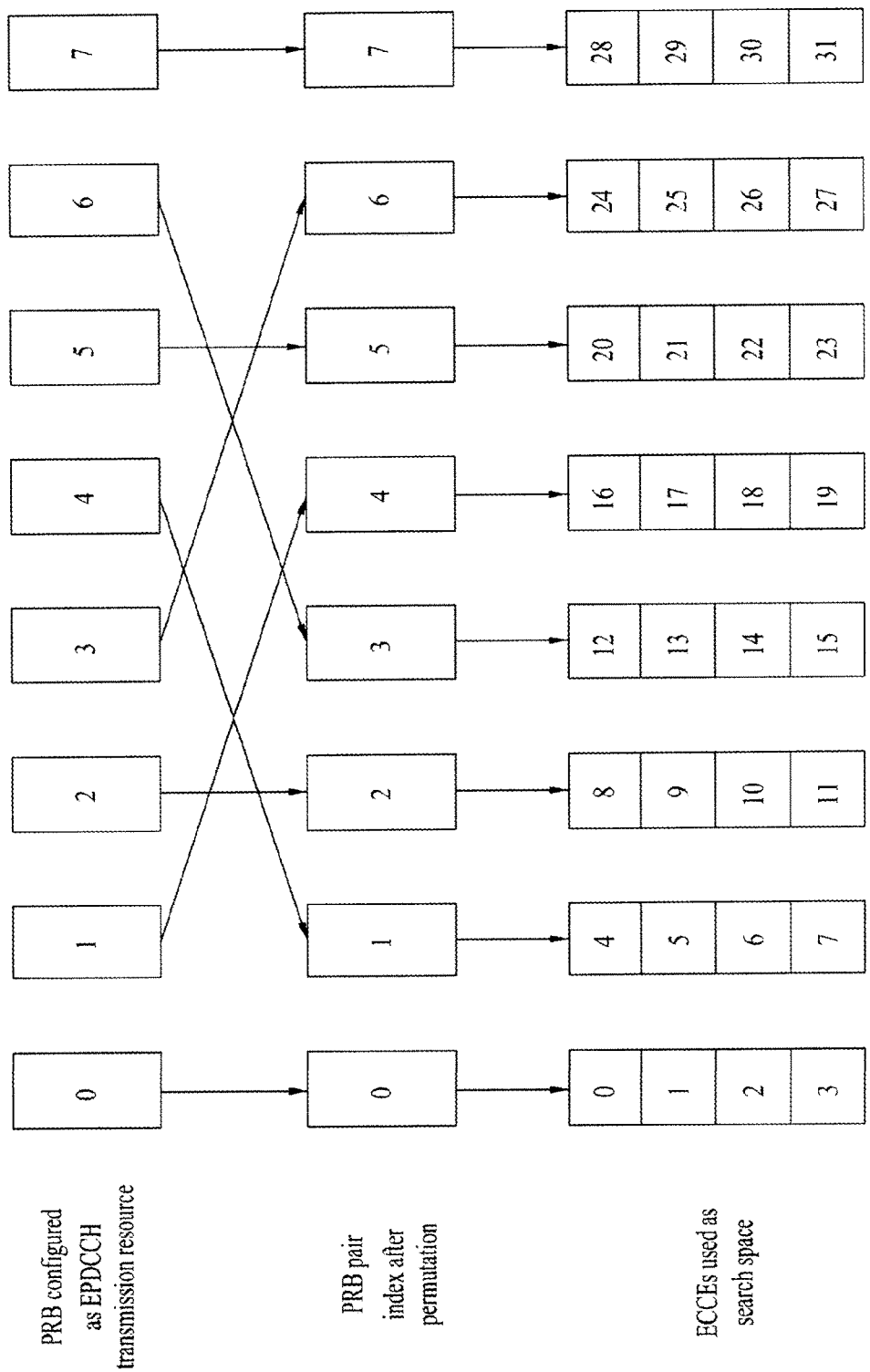
FIG. 10 illustrates an example of defining ECCEs after permutation of EPDCCH resource regions according to an embodiment of the present invention.

FIG. 10 illustrates an example of permuting EPDCCH resource regions and then defining ECCEs according to an embodiment of the present invention. In FIG. 10, it is assumed that an eNB sets 8 PRB pairs as EPDCCH resource regions.

Referring to FIG. 10, the sequence of the 8 PRB pairs is permuted through bit reversal and then 4 ECCE are defined per PRB pair so as to configure a total of 32 ECCEs. Here, bit reversal refers to an operation of sequentially assigning indexes to PRB pairs, binarizing the indexes and reversing the binary indexes to designate the indexes as indexes of corresponding PRB pairs. However, bit reversal is one of permutation schemes for permuting a sequence of PRB pairs and other methods may be employed to permute a sequence of PRB pairs.

Figure 11:
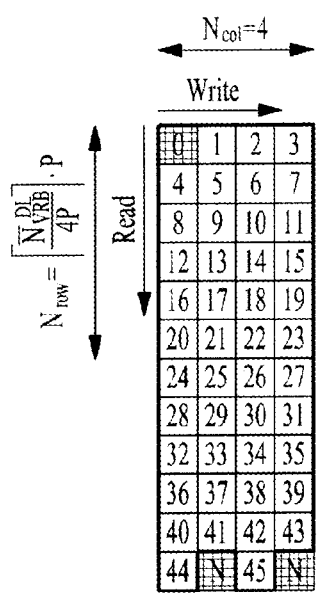
FIGS. 11 and 12 illustrate another example of permutation of EPDCCH resource regions according to an embodiment of the present invention.
Figure 12:
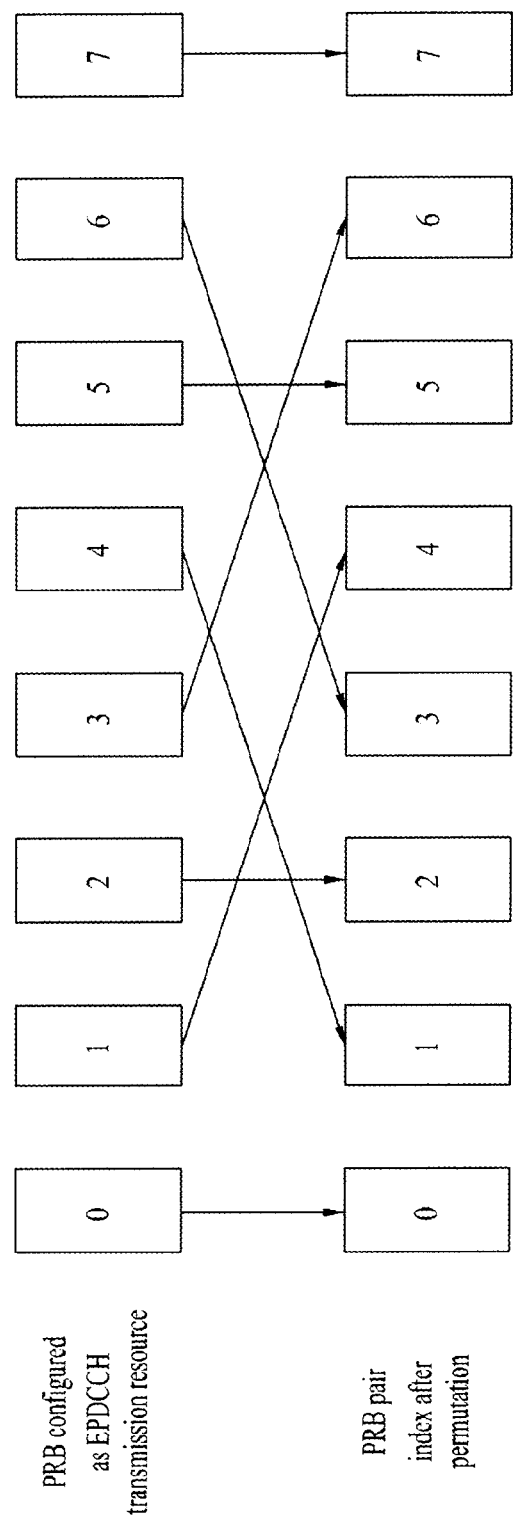

FIGS. 11 and 12 illustrate another example of permuting EPDCCH resource regions according to an embodiment of the present invention. In FIG. 11, block interleaving is applied as a permutation scheme. According to block interleaving, indexes are re-assigned in such a manner that the indexes are input in column order and then read in row order. FIG. 11 illustrates a block interleaving scheme when the number of columns is 4.

A sequence of PRB pairs can be permuted by adjusting a parameter such as $N_{row}$ shown in FIG. 11. FIG. 12 illustrates an example of permuting PRB pair indexes through block interleaving with $N_{row}$ set to 2 and $N_{col}$ set to 4.

Particularly, $N_{row}$ may depend on the number of PRB pairs set to an EPDCCH transmission region. When a small number of PRB pairs is configured, $N_{row}$ may be set to a smaller value such that the sequence of the small number of PRB pairs can be sufficiently permuted. That is, block interleaving can be applied by setting $N_{row}$ to 2 when the number of configured PRB pairs is less than a predetermined value (e.g. 7) and to 4 when the number of PRB pairs exceeds the predetermined value.

As shown in FIGS. 11 and 12, configuration of an E-PDCCH search space is simplified after a sequence of PRB pairs is permuted. For example, in the case of distributed E-PDCCH transmission at aggregation level 2, frequency spacing of a predetermined level or higher can be secured even when ECCEs of neighboring PRB pairs are used. For example, when ECCE #0 and ECCE #4 are used, two PRB pairs including these ECCEs are spaced apart from each other by a distance corresponding to 4 PRBs rather than being consecutive.

This property may become distinct at a higher aggregation level. For example, when ECCEs are respectively extracted from 4 consecutive PRB pairs to configure an EPDCCH of aggregation level 4, the 4 PRB pairs are appropriately spaced, as shown in FIG. 10. That is, when an EPDCCH of aggregation level 4 is configured using ECCE #0, ECCE #4, ECCE #8 and ECCE #12, 4 PRB pairs respectively including these ECCEs are spaced at an interval of 2 PRBs rather than being consecutive.

However, since an interval between PRB pairs is not secured in all cases, ECCEs used for aggregation may be limited according to a method of permuting a sequence of PRB pairs. More specifically, when bit reversal is used, as shown in FIG. 10, ECCEs may be limited such that ECCEs are respectively selected from PRB pairs #(2m) and #(2m+1) in the case of aggregation level 2 and ECCEs are respectively selected from PRB pairs #(4m), #(4m+1), #(4m+2) and #(4m+3) in the case of aggregation level 4. By limiting ECCEs in this manner, EPDCCH transmission can be performed using the best distributed PRB pairs.

Even after permutation of PRB pair indexes, localized EPDCCH transmission can be easily achieved using ECCEs having consecutive indexes. For example, localized transmission of aggregation level 4 can be achieved if ECCEs #0, #1, #2 and #3 are used in FIG. 10. Performing localized EPDCCH transmission of aggregation level L on the basis of ECCE #n may be interpreted as using ECCEs #n, #(n+1), . . . , #(n+L−1), In addition, performing distributed EPDCCH transmission of aggregation level L on the basis of ECCE #n may be interpreted as using ECCEs #n, #(n+K), . . . . #(n+(L−1)K).

As described above, permutation of a sequence of PRB pairs selected as an EPDCCH transmission region is an important part of configuration of an EPDCCH search space. However, if a sequence of PRB pairs is permuted according to a uniform method, an inappropriate result may be obtained.

More specifically, the quantity of resources that can be used for an EPDCCH in PRB pairs may vary with RS configuration such as CRS or CSI-RS configuration, the size of an existing PDCCH region, the length of a DwPTS of a special subframe in a TDD system, etc. Accordingly, it is desirable to reduce the number of ECCEs formed per PRB pair to maintain an EPDCCH coding rate at a specific level.

Figure 13:
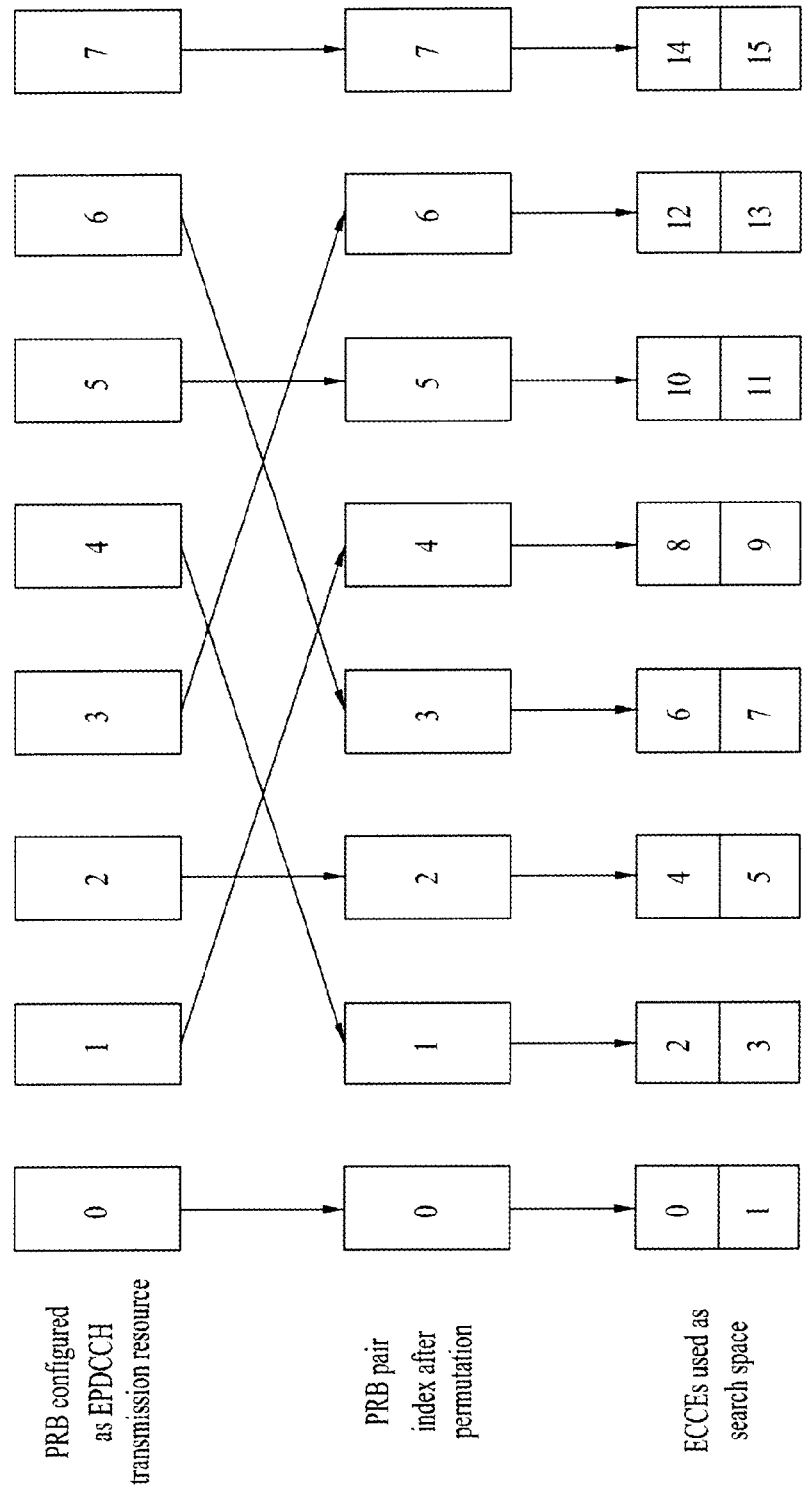
FIG. 13 illustrates an example of reducing the number of ECCEs formed in one PRB pair.

FIG. 13 illustrates an example of reducing the number of ECCEs formed per PRB pair. In FIG. 13, it is assumed that the number of ECCEs per PRB pair is reduced from 4 to 2.

In this case, when a sequence of PRB pairs is permuted using bit reversal, localized EPDCCH transmission may be limited. For example, when localized EPDCCH transmission of aggregation level 4 is attempted using ECCE #n, ECCE #(n+1), ECCE #(n+2) and ECCE #(n+3) shown in FIG. 13, two ECCEs are located in different PRB pairs, particularly, in PRB pairs spaced apart from each other by half the total number of configured PRB pairs.

To solve this problem, when a sequence of PRB pairs selected as an EPDCCH transmission region is permuted, a permutation scheme may be modified and applied in consideration of the number of ECCEs defined per PRB pair.

Specifically, when a number of ECCEs, which is less than a predetermined value, is defined per PRB pair, a predetermined number of consecutive PRB pairs from among PRB pairs set to an EPDCCH transmission region is grouped into one group and indexed and then permutation is applied thereto.

Figure 14:
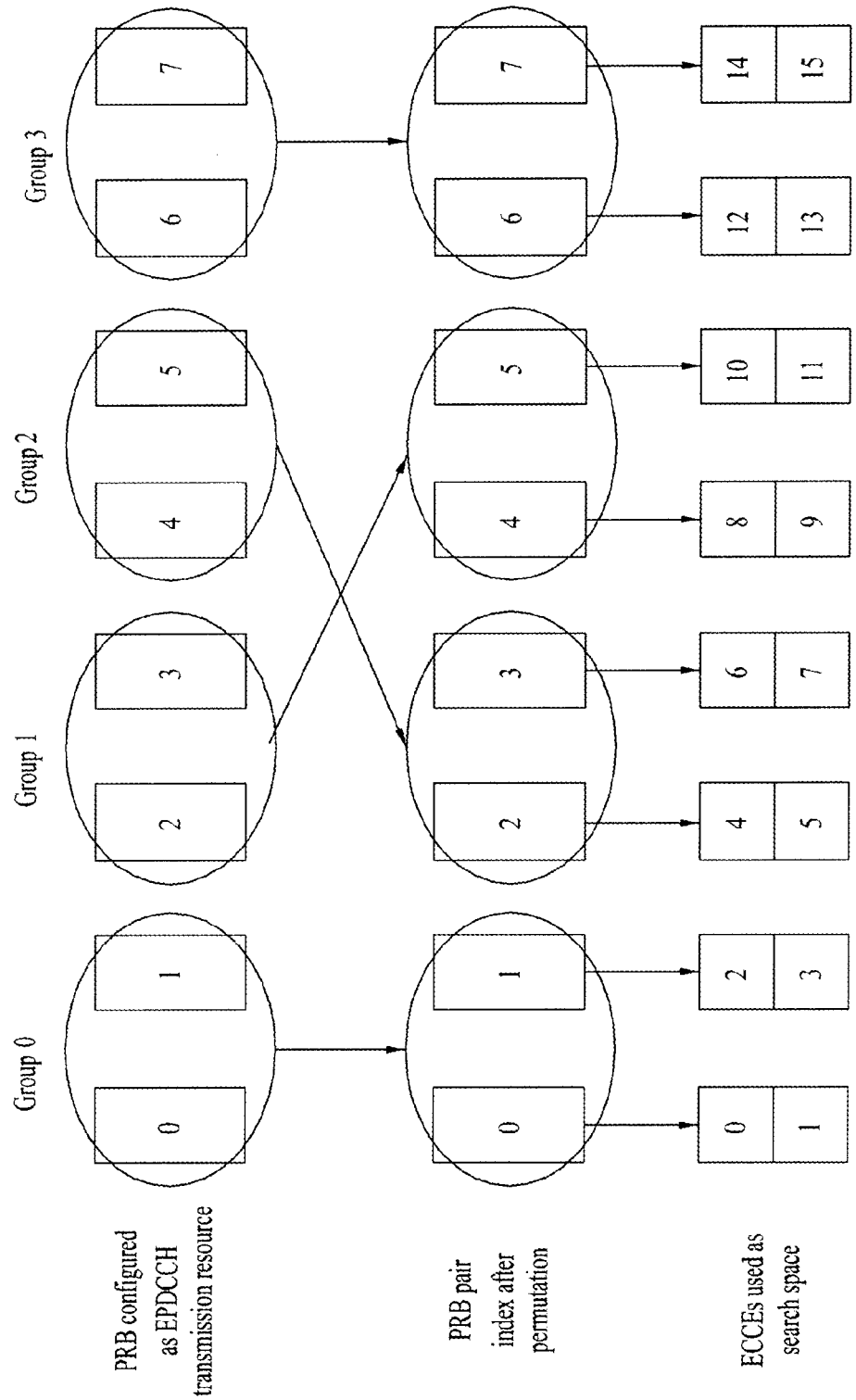
FIG. 14 illustrates an example of application of permutation on a PRB pair group basis according to an embodiment of the present invention.

FIG. 14 illustrates an example of permutation on a PRB pair group basis according to an embodiment of the present invention. In FIG. 14, it is assumed that 2 ECCEs are defined per PRB pair.

Referring to FIG. 14, two consecutive PRB pairs are grouped into a PRB pair group, permutation is applied per PRB pair group and ECCE indexes are allocated to PRB pairs. Consequently, operation of simultaneously performing localized EPDCCH transmission at aggregation level L using ECCE #n, ECCE #(n+1), . . . , ECCE #(n+L−1) and distributed EPDCCH transmission using ECCE #n, ECCE #(n+P), . . . , ECCE #(n+(L−1)P) can be maintained. Here, P indicates the number of ECCEs defined per PRB pair group.

Furthermore, it is possible to define ECCEs from PRB pairs set to an EPDCCH transmission region, apply permutation to the ECCEs and then re-assign ECCE indexes to the ECCEs. In this case, operation of grouping ECCEs and applying permutation thereto is advantageous to simultaneously support localized EPDCCH transmission and distributed EPDCCH transmission.

Figure 15:
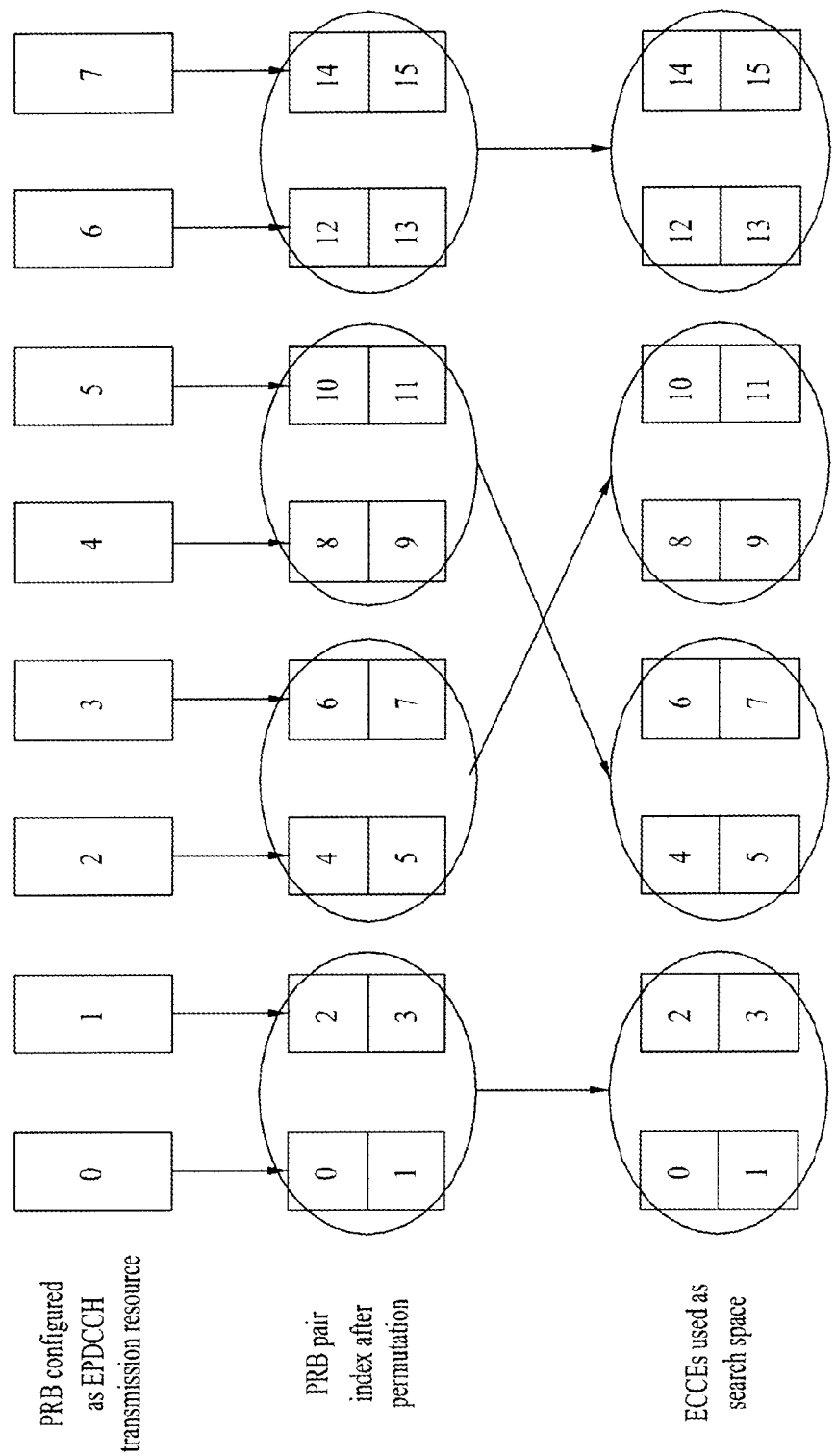
FIGS. 15 and 16 illustrate an example of application of permutation on an ECCE basis according to an embodiment of the present invention.
Figure 16:
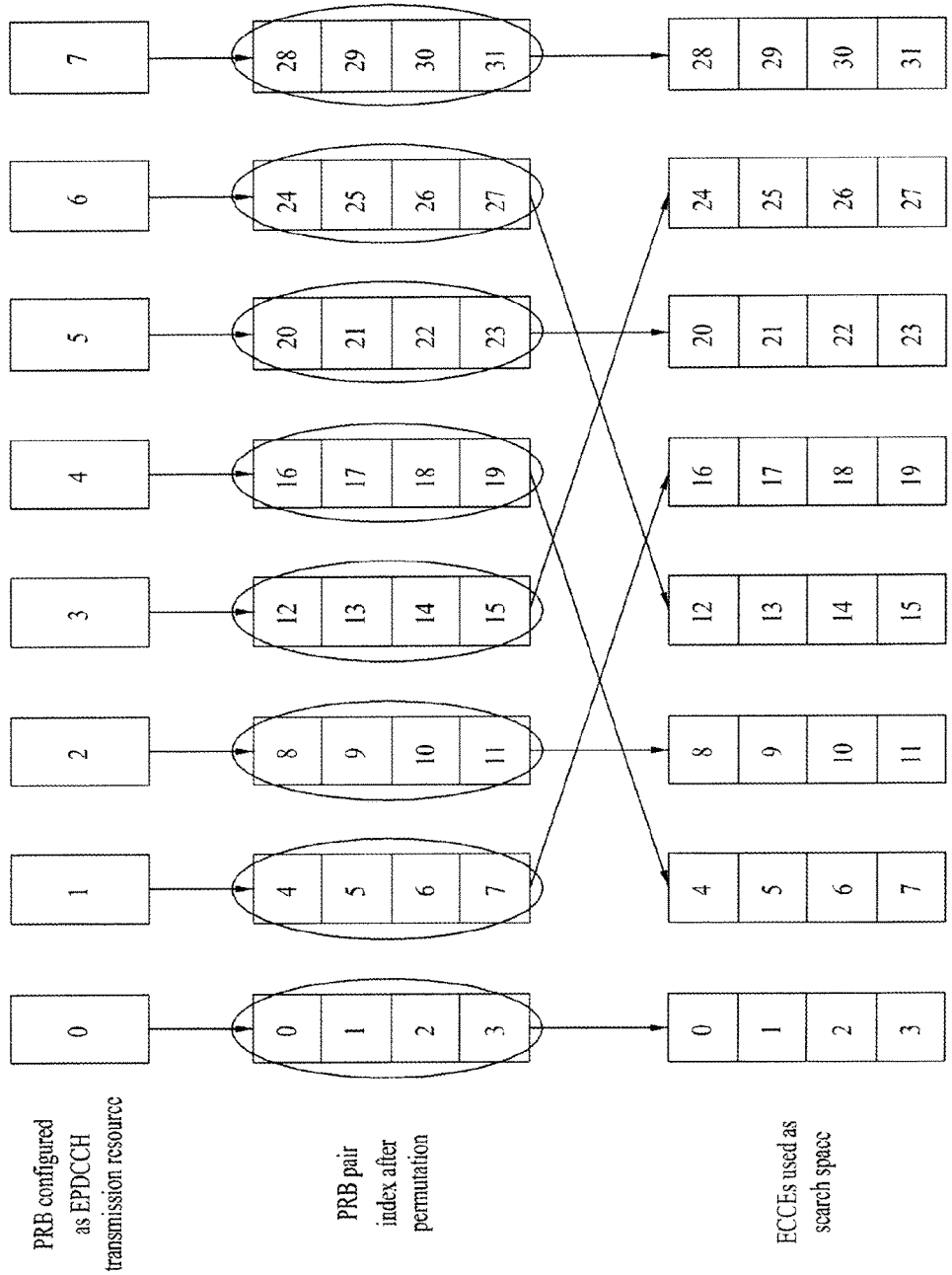

FIGS. 15 and 16 illustrate examples of applying permutation on an ECCE group basis according to an embodiment of the present invention. In FIGS. 15 and 16, it is assumed that 4 ECCEs form one ECCE group.

Referring to FIG. 15, the same result as that of the case of FIG. 14 is obtained since 2 ECCEs are defined per PRB pair. In the case of FIG. 16, however, 4 ECCEs belonging to one ECCE group are all generated from one PRB pair since 4 ECCEs are defined per PRB pair. Accordingly, the same result as that of the case of FIG. 10 can be obtained in FIG. 16.

According to another method of permuting PRBs configured for an EPDCCH, PRB pairs spaced apart by a predetermined interval are grouped into a PRB pair group and PRB pair groups formed in this manner are located to have consecutive indexes.

Figure 17:
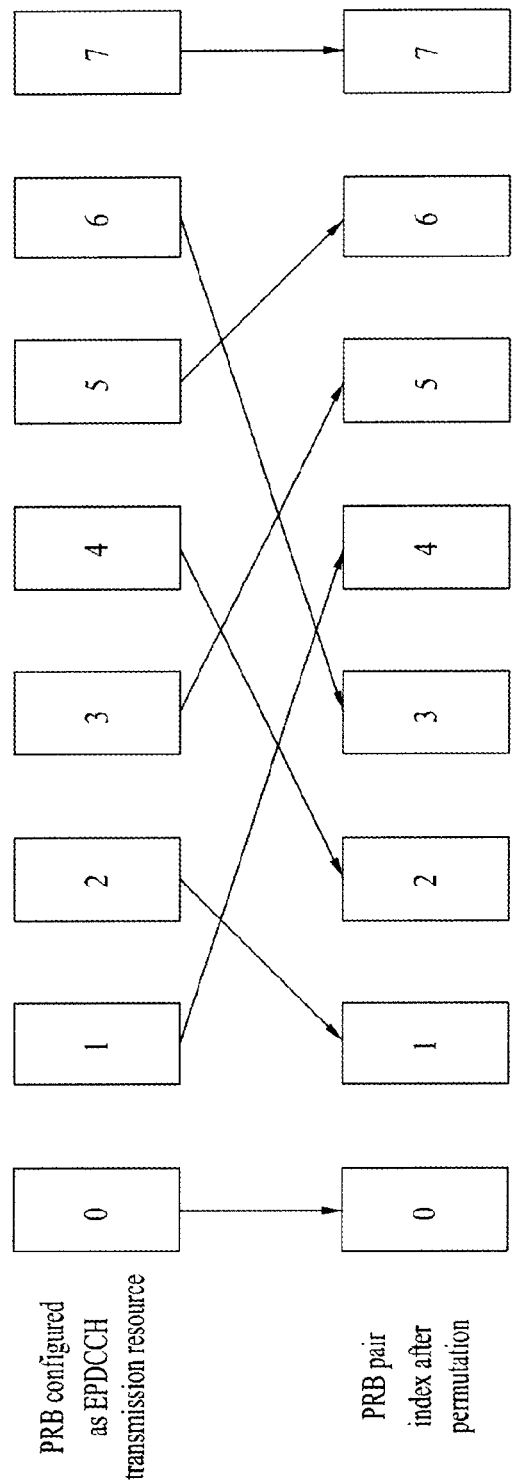
FIG. 17 illustrates another example of permutation on a PRB pair group basis according to an embodiment of the present invention.

FIG. 17 illustrates another example of permutation on a PRB pair group basis.

Referring to FIG. 17, 4 PRB pairs spaced apart by an interval of 2 PRB pairs are grouped into one PRB pair group, for 8 PRB pairs configured for an EPDCCH, to form a total of 2 PRB pair groups, and then PRB pairs are indexed on a PRB pair group basis. That is, the first PRB pair group consists of PRB pairs #0, #2 , #4 and #6 and the second PRB pair group consists of PRB pairs #1, #3 , #5 and #7 in FIG. 17. Subsequently, the PRB pairs belonging to the first PRB pair group are indexed first and then the PRB pairs belonging to the second PRB pair group are indexed.

According to this scheme, since PRB pairs having consecutive indexes while belonging to the same PRB pair group are uniformly distributed in the PRB domain, distributed EPDCCH transmission can be effectively implemented using PRB pairs in a single PRB pair group.

In addition, an interval of PRB pairs belonging to the same PRB pair group may be controlled according to situation. For example, when N PRB pairs are configured for an EPDCCH, the interval can be set to $$\left\lfloor \frac{N}{4} \right\rfloor$$

such that every PRB pair group includes 4 PRB pairs and these 4 PRB pairs are uniformly distributed in the PRB domain.

The aforementioned PRB pair index permutation may be applied to transmission of an EPDCCH in which a single ECCE is distributed into a plurality of PRB pairs. For example, after permutation as in FIG. 17, each ECCE can be configured using REs located in a plurality of consecutive PRB pairs.

Figure 18:
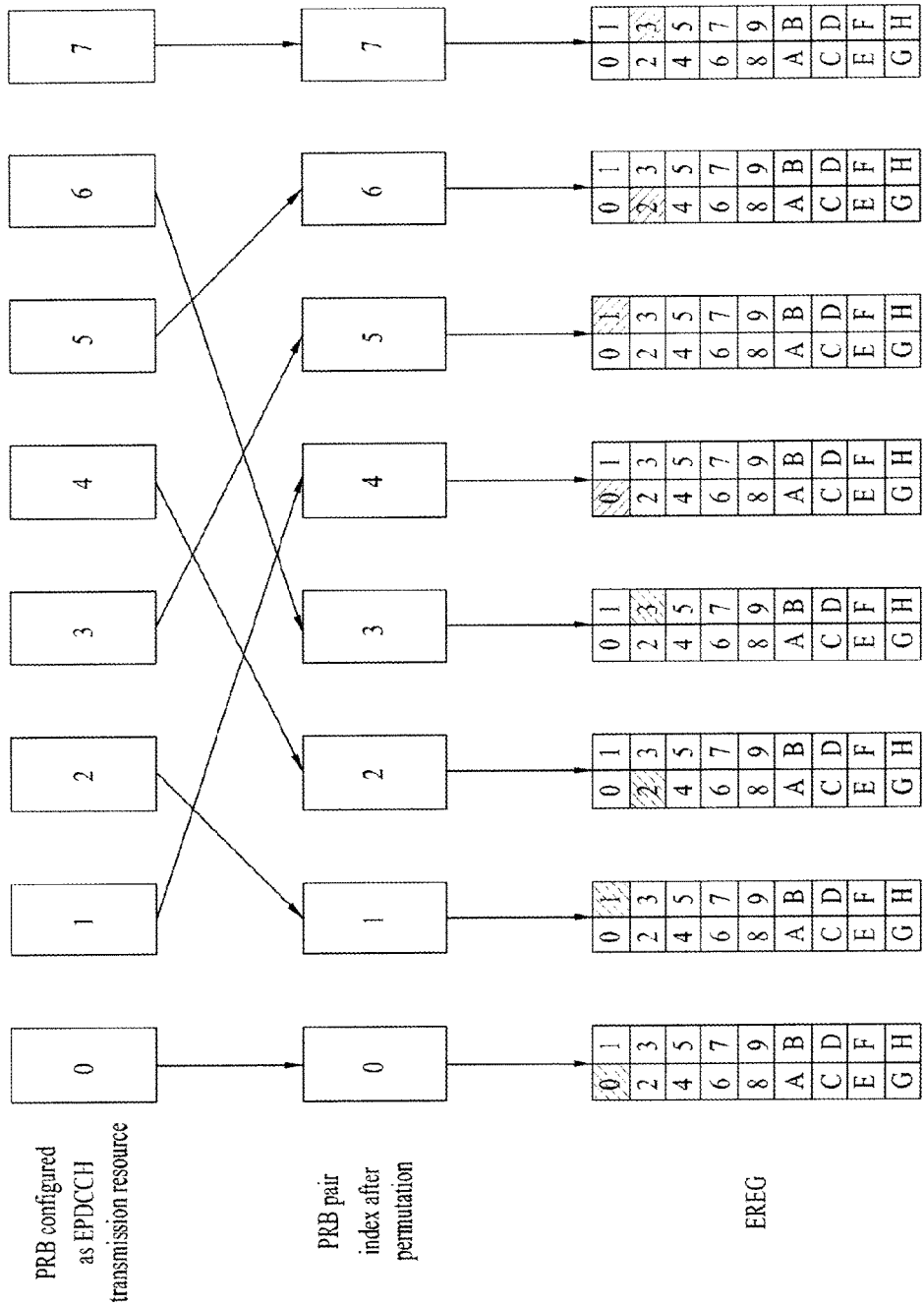
FIG. 18 illustrates an example of application of PRB pair indexes during EPDCCH transmission in which a single ECCE is distributed to a plurality of PRB pairs according to an embodiment of the present invention.

FIG. 18 illustrates an example of application of permutation of PRB pair indexes during transmission of an EPDCCH in which a single ECCE is distributed into a plurality of PRB pairs according to an embodiment of the present invention.

Referring to FIG. 18, after permutation of PRB pairs configured for an EPDCCH according to the scheme shown in FIG. 17, each PRB pair is segmented into 16 enhanced resource element groups (EREGs) and an ECCE is configured using 4 EREGs belonging to different PRB pairs.

In this case, since PRB pairs used to configure one ECCE are consecutive PRB pairs on indexes after permutation, the PRB pairs are uniformly distributed in the PRB domain on physical resources. That is, EREGs constituting a single ECCE are uniformly distributed in the PRB domain.

In FIG. 18, EREGs #0, #1 , #2 and #3 are respectively selected from PRB pairs #0, #1 , #2 and #3 on the basis of PRB pair indexes after permutation to configure the first ECCE. The second ECCE is configured by respectively selecting EREGs #0, #1 , #2 and #3 from PRB pairs #4, #5 , #6 and #7.

Figure 19:
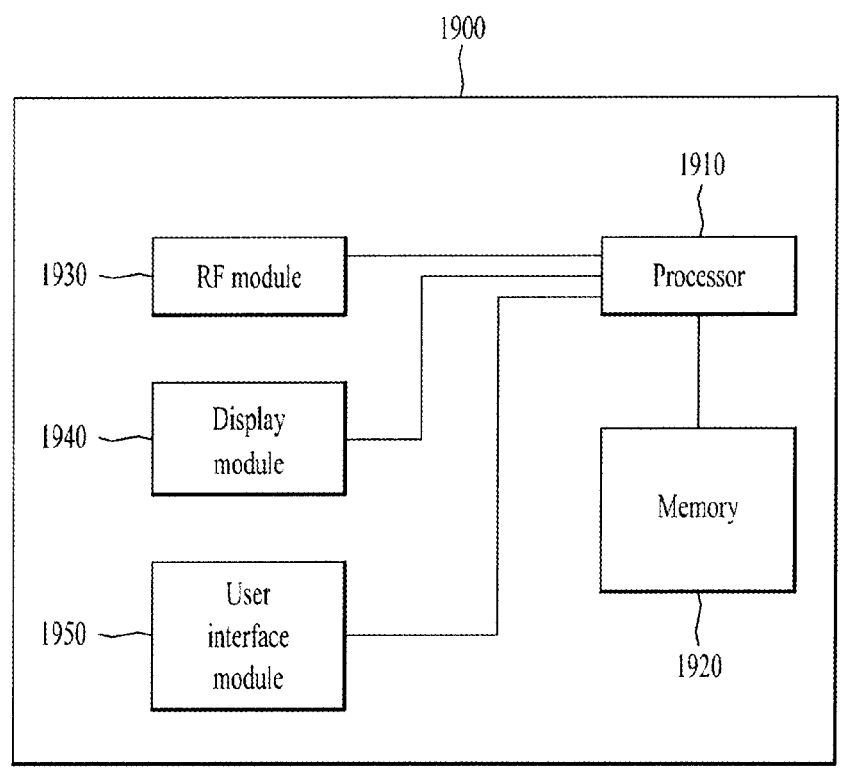
FIG. 19 is a block diagram of a communication apparatus according to an embodiment of the present invention.

FIG. 19 is a block diagram of a communication apparatus according to an embodiment of the present invention.

Referring to FIG. 19, a communication apparatus 1900 includes a processor 1910, a memory 1920, an RF module 1930, a display module 1940 and a user interface module 1950.

The communication apparatus 1900 is illustrated for convenience of description and some modules may be omitted. Furthermore, the communication apparatus 1900 may further include necessary modules. Some modules of the communication apparatus 1900 may be subdivided. The processor 1910 is configured to perform operations according to the embodiments of the present invention, described with reference to attached drawings. Refer to descriptions of FIGS. 1 to 18 for detailed operations of the processor 1910.

The memory 1920 is connected to the processor 1910 and stores an operating system, applications, program code, data, etc. The RF module 1930 is connected to the processor 1910 and converts baseband signals into RF signals or converts RF signals into baseband signals. To achieve this, the RF module 1930 performs analog conversion, amplification, filtering and frequency upconversion or reverse operations thereof. The display module 1940 is connected to the processor 1910 and displays various types of information. The display module 1940 may use a well-known element such as an LCD (Liquid Crystal Display), LED (Light Emitting Diode), OLED (Organic Light Emitting Diode) or the like. However, the display module 1940 is not limited thereto. The user interface module 1950 may be connected to the processor 1910 and configured in the form of a combination of well-known user interfaces such as a keypad, touchscreen and the like.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method for setting a search space for a downlink control channel in a wireless communication system and the apparatus therefor have been described in the context of a 3GPP LTE system, the present invention is also applicable to many other wireless communication systems.

The invention claimed is:

1. A method for transmitting, by a base station, an Enhanced Physical Downlink Control Channel (EPDCCH) to a user equipment (UE) in a wireless communication system, the method comprising:
    setting physical resource block pairs for the EPDCCH;
    allocating first indexes represented as binary numbers to the physical resource block pairs; and
    reversing the first indexes and re-allocating the reversed first indexes to the physical resource block pairs,
    defining an Enhanced Control Channel Element (ECCE) for each of the re-allocated physical resource block pairs;
    selecting ECCEs in a number corresponding to an aggregation level of the EPDCCH; and
    transmitting the EPDCCH to the UE using the selected ECCEs.

2. The method according to claim 1, wherein the selecting of the ECCEs comprises selecting ECCEs corresponding in number to the aggregation level from one of the re-allocated physical resource block pairs.

3. The method according to claim 1, wherein the selecting of the ECCEs comprises selecting ECCEs corresponding in number to the aggregation level from physical resource block pairs having a specific number of consecutive indexes from among the re-allocated physical resource block pairs.

4. A method for receiving, by a user equipment (UE), an Enhanced Physical Downlink Channel (EPDCCH) from a base station in a wireless communication system, the method comprising:
    setting physical resource block pairs for the EPDCCH;
    allocating first indexes represented as binary numbers to the physical resource block pairs;
    reversing the first indexes and re-allocating the reversed first indexes to the physical resource block pairs;
    defining an Enhanced Control Channel Element (ECCE) for each of the re-allocated physical resource block pairs; and
    monitoring EPDCCH candidates composed of ECCEs in a number corresponding to an aggregation level of the EPDCCH, in the re-allocated physical resource block pairs, to receive the EPDCCH.

* * * * *